J. H. HELM.
Heating Stove.
No. 90,537.                                           Patented May 25, 1869.
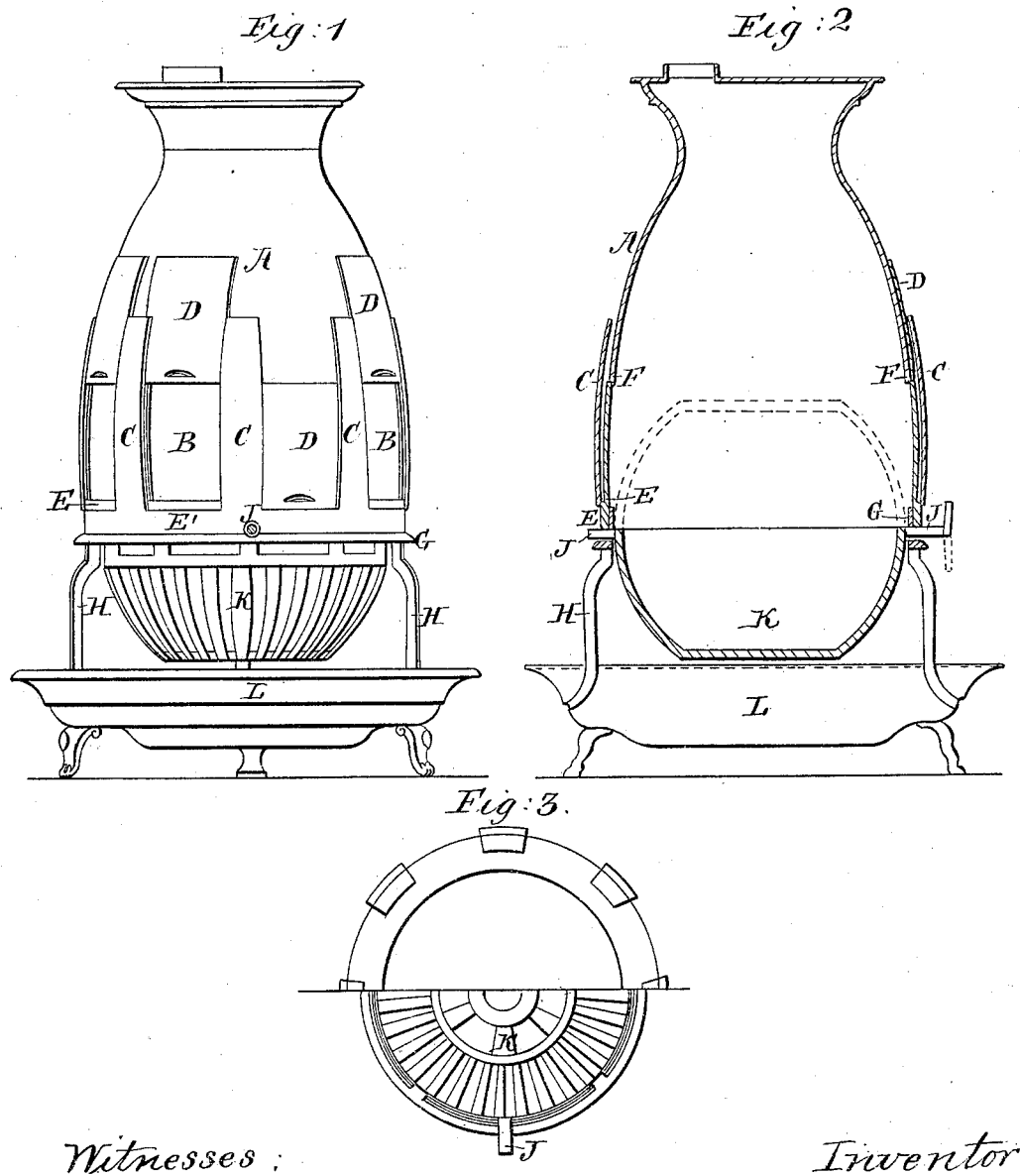

JOHN H. HELM, OF PITTSBURG, PENNSYLVANIA.

Letters Patent No. 90,537, dated May 25, 1869.

---

COAL-STOVE.

---

The Schedule referred to in these Letters Patent and making part of the same.

---

*To all whom it may concern:*

Be it known that I, JOHN H. HELM, of the city of Pittsburg, in the county of Allegheny, and State of Pennsylvania, have invented a new and useful Improvement in Stoves; and I hereby declare that the following is a full, clear, and exact description thereof, reference being had to the accompanying drawings, forming part of this specification, and to the letters of reference marked thereon, in which—

Figure 1 represents a perspective view of my stove.

Figure 2, a transverse vertical section of the same.

Figure 3, a cross-section on a horizontal plane, just above, and partly exhibiting the grate, and partly the position of the doors.

All the drawings are lettered, and similar letters denote like parts in the several views.

The nature of my invention consists in the construction, combination, and arrangement of the several parts, producing a new and elegant stove, suitable for halls, parlors, offices, &c., and which is adapted to, and capable of burning the various kinds of coals now in use, in an open grate, without becoming so hot as to burn the particles of vegetable or animal matter, more or less of which are usually floating around a stove, and which, when burned, communicate an unwholesome effluvium to the atmosphere of the room, as experienced in close stoves which become highly heated.

This stove, by being open entirely around and below the grate, and so constructed as to open above the grate, affords the heat an opportunity to diffuse itself to the greatest extent; in short, most of the advantages and comforts derivable from employment of an open fire-place, are attainable by the use of this stove.

To enable others to understand, make, and use my improved stove, I will proceed to describe its construction, by reference to the accompanying drawings.

I make this stove of cast-iron. The upper part A, being cylindrical, or bottle-shaped, is provided at its top with the usual contrivance for the reception of a pipe.

The base of this cylindrical shell A, is also formed with a number of openings, B, entirely around it, each separated from the other by a narrow division, and to the outside of these is riveted, or otherwise secured, a corresponding number of guides, C, between which slide vertically-moving doors D.

These doors, when down, close the openings B, and rest upon a ring, E E', by which they are prevented from passing the point of closing; and when raised up to the height required, are kept there by shoving them back so that their lower edges will rest upon a ledge, F, made by a sudden contraction of the cylindrical shell A, at that point The shell so made is placed, as shown in the drawings, figs. 1 and 2, upon a ring, G, made to fit inside the base of the shell A, and hold it firmly in place.

This ring rests upon vertical standards, H, and between which, by means of trunnions J, passing through the ring, is suspended an open, basket-shaped grate, K, so arranged, with relation to the body of the stove, and the ring in which it is suspended, as to admit of its being inverted, as shown by the dotted lines in fig. 2, to empty or discharge its contents into a large, concave, saucer-shaped receptacle, L, of greater diameter than the body of the stove, and which may be supported and kept a safe distance from the floor of the room, as shown, by means of short legs.

Although I have confined myself to the description of a circular stove, still I intend to apply this construction of shell in part, with vertically-moving doors, open grate, &c., to stoves of different shapes, such as the so-called Franklin stove, and to the improvement of ordinary fire-places. And this I can do by making a half stove, such a one as would be formed by dividing that described, on a line drawn through its centre on a vertical plane, and attaching to the half stove so formed, a plate at its flat or open side, by which it may be used as an ordinary stove, in the middle of a room, or set against a properly-constructed wall, provided with flues, &c., to carry off the smoke.

Having stated the nature of my invention, and its construction—

I claim the circular, bottle-shaped shell A, with openings B, extending around its base; guides C, vertically-moving doors D, supporting-ring G, standards H, revolving basket-grate K, and concave receptacle L; the whole being constructed, combined, and arranged, with relation to each other, substantially in the manner shown and described.

J. H. HELM.

Witnesses:
   JOSIAH W. ELLS,
   J. B. WHALEY.